(12) United States Patent
Basu et al.

(10) Patent No.: US 11,294,253 B2
(45) Date of Patent: Apr. 5, 2022

(54) CONCURRENT UTILIZATION OF MONOLAYER GRAPHENE AS THE PLANAR-ALIGNMENT LAYERS AND THE TRANSPARENT CONDUCTIVE ELECTRODES IN ELECTRO-OPTIC LIQUID CRYSTAL DEVICES

(71) Applicant: The Government of the United States of America, as represented by the Secretary of the Navy, Arlington, VA (US)

(72) Inventors: Rajratan Basu, Annapolis, MD (US); Daniel Kinnamon, Annapolis, MD (US); Christopher M. Spillmann, Annandale, VA (US); Jakub Kolacz, Washington, DC (US); Jesse A. Frantz, Washington, DC (US); Jason D. Myers, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/308,430

(22) Filed: May 5, 2021

(65) Prior Publication Data

US 2021/0255516 A1    Aug. 19, 2021

Related U.S. Application Data

(62) Division of application No. 16/738,150, filed on Jan. 9, 2020, now Pat. No. 11,131,898, which is a division of application No. 15/925,597, filed on Mar. 19, 2018, now Pat. No. 10,564,505.

(60) Provisional application No. 62/478,929, filed on Mar. 30, 2017.

(51) Int. Cl.
    *G02F 1/141*     (2006.01)
    *G02F 1/1337*    (2006.01)
    *G02F 1/135*     (2006.01)
    *G02F 1/155*     (2006.01)
    *G02F 1/03*      (2006.01)

(52) U.S. Cl.
    CPC .......... *G02F 1/1418* (2013.01); *G02F 1/0316* (2013.01); *G02F 1/1337* (2013.01); *G02F 1/1357* (2021.01); *G02F 1/133711* (2013.01); *G02F 1/133753* (2013.01); *G02F 1/155* (2013.01); *G02F 1/133738* (2021.01); *G02F 1/133757* (2021.01); *G02F 1/133796* (2021.01)

(58) Field of Classification Search
    CPC ...... G02F 1/0316; G02F 1/1357; G02F 1/155; G02F 1/1676; G02F 2201/12
    See application file for complete search history.

(56) References Cited

U.S. PATENT DOCUMENTS

2010/0245954 A1* 9/2010 Ahling .............. G02F 1/133784
                                                    359/30
2012/0070612 A1* 3/2012 Lee .......................... H01B 1/04
                                                    428/141

* cited by examiner

*Primary Examiner* — Lauren Nguyen
(74) *Attorney, Agent, or Firm* — US Naval Research Laboratory; Stephen T. Hunnius

(57) ABSTRACT

A graphene and liquid crystal device comprising a substrate, a layer of graphene on the substrate, and a layer of liquid crystal on the layer of graphene. A graphene and liquid crystal device wherein the layer of graphene is an alignment layer and an electrode for a liquid crystal device.

6 Claims, 6 Drawing Sheets

CONCURRENT UTILIZATION OF MONOLAYER GRAPHENE AS THE PLANAR-ALIGNMENT LAYERS AND THE TRANSPARENT CONDUCTIVE ELECTRODES IN ELECTRO-OPTIC LIQUID CRYSTAL DEVICES

REFERENCE TO RELATED APPLICATION

This application is a non-provisional of, and claims priority to and the benefits of, U.S. Provisional Patent Application No. 62/478,929 filed on Mar. 30, 2017, and U.S. patent application Ser. No. 15/925,597 filed on Mar. 19, 2018, and U.S. patent application Ser. No. 16/738,150 filed on Jan. 9, 2020, the entirety of each is hereby incorporated by reference.

BACKGROUND

This disclosure teaches methods for achieving alignment of liquid crystal (LC) using graphene layers.

This disclosure teaches concurrent creation of alignment layers and electrodes using graphene for controlled reorientation of LC by an electric field.

This disclosure teaches a new product comprising graphene layers as both alignment layers and electrodes.

Electro-optic LC devices can be transmissive (for example, displays), reflective (for example, tunable filters), or refractive (for example, waveguides such as steerable electro-evanescent optical refraction devices).

The principle mechanism of these devices relies on two factors: the ability of the surface to homogeneously align liquid crystals and the ability of that alignment to change with an applied electric field.

These two requirements are usually fulfilled by electrodes with relatively low transmission losses that are deposited on parallel substrates and a LC aligning layer between the electrodes and the LC.

In a conventional LC cell, indium tin oxide layers serve as the electrodes and polyimide layers with unidirectional rubbing direction serve as the aligning layers of the LC director at the two substrates. A wide range of conductive materials and (in)organic materials have been developed and demonstrated as effective electrodes and alignment layers for LC, respectively.

While these conductive and alignment layer combinations work for the majority of LC-based transmissive applications due to short path lengths (~ums), an ideal scenario is where the two functions are met with a single layer of material.

In certain architectures, such as a slab waveguide with an LC-cladding, additional layers of material introduce unwanted absorption and scattering losses over relatively long path lengths (~cms), thereby significantly degrading throughput.

Reducing the conductive and aligning functions with a single layer of material offers the potential to minimize these losses and optimize throughput of light over a wide range of spectral bands. Graphene, the two-dimensional form of carbon, is an ideal material to fulfill the role as both an LC electrode material and an aligning layer.

We demonstrate the first use of graphene being concurrently used as the electrode and the alignment layer.

SUMMARY OF DISCLOSURE

Description

This disclosure teaches methods for achieving alignment of liquid crystal (LC) using graphene layers.

This disclosure teaches concurrent creation of alignment layers and electrodes using graphene for controlled reorientation of LC by an electric field.

This disclosure teaches a new product comprising graphene layers as both alignment layers and electrodes.

We demonstrate the first use of graphene being concurrently used as the electrode and the alignment layer.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure Other objects, advantages and novel features of the disclosure will be set forth in the following detailed description when considered in conjunction with the drawings.

DETAILED DESCRIPTION OF THE INVENTION

This disclosure teaches methods for achieving alignment of liquid crystal (LC) using graphene layers, teaches concurrent creation of alignment layers and electrodes using graphene for controlled reorientation of LC by an electric field, and teaches a new product comprising graphene layers as both alignment layers and electrodes.

We demonstrate the first use of graphene being concurrently used as the electrode and the alignment layer.

This innovation is unique because LC between two graphene sheets forms a natural electro-optic device. LC molecules can stabilize themselves on the honeycomb pattern of graphene or carbon nanotubes, employing the $\pi$-$\pi$ electron stacking with a binding energy of −2 eV.

This replacement effectively reduces the thickness of all the alignment layers and electrodes from 10-100 s of nm to about 1 nm.

The reduction in path length has the potential to achieve higher optical throughput and access a wider spectral range for electro-optic applications.

The stacking of benzene on graphene also enhances orientational order. This order enhancement coupled with the relatively large anchoring strength that results from $\pi$-$\pi$ stacking of the LC on the graphene honeycomb means lower thermal scattering losses from the LC, which make it more practical for NIR-vis-UV light in waveguide architectures.

Example 1

Nematic Alignment on Graphene

Figure 1:
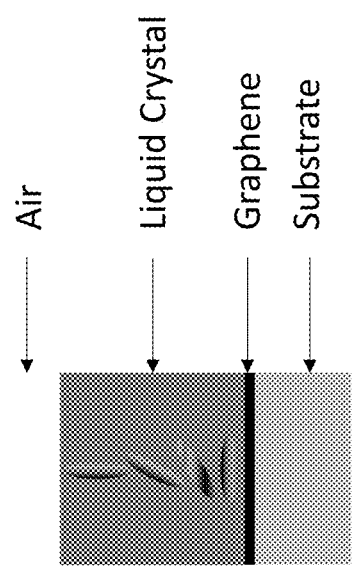
FIG. 1 is a schematic diagram of one embodiment of a LC device with a graphene alignment layer.

In one embodiment of the invention, shown in shown in FIG. 1, a LC device is comprised of a substrate, a monolayer of graphene and a LC thin film. The alignment of this embodiment was tested in a prototype.

Chemical vapor deposition (CVD) grown monolayer graphene film on a copper foil was first obtained from Graphene Supermarket, Inc. The graphene film on copper was continuous, with irregular holes and cracks. In addition, the graphene film was polycrystalline (i.e. the presence of grains with different crystallographic orientation).

A small droplet of the LC in the isotropic phase was first placed on the graphene film. The LC droplet was then blown away gently by a dust blower, which left a thin LC layer at the graphene surface. The LC-coated graphene on copper substrate was then heated up in the isotropic phase to get rid of any residual order from the coating process and then slowly cooled down to the nematic phase.

Figure 2:
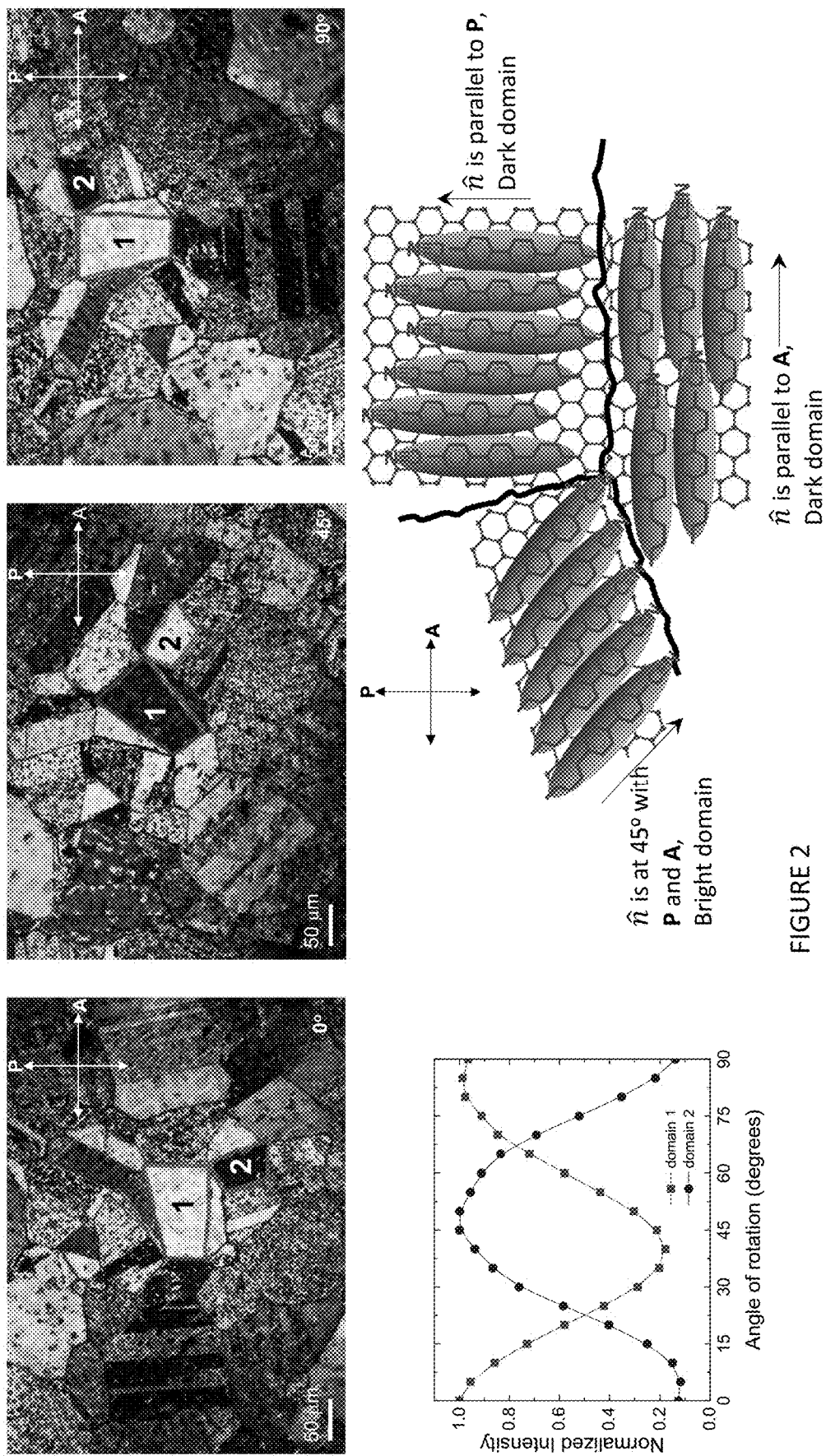
FIG. 2 illustrates several views of Crossed Polarized Light Microscopy (XPLM) images of a thin layer of LC on a CVD grown graphene film on copper foil at 0°, 45° and 90° to the polarizer. Domains 1 and 2 are labeled in order to track the change in intensity as the sample is rotated. One view illustrates Normalized intensity as a function of angle of rotation for domains 1 and 2. The final view is a schematic representation of LC stacking on polydomain graphene, highlighting the existence of domain boundaries. The $\pi$-$\pi$ electron stacking is demonstrated by matching the benzene rings of the LC molecules on the honeycomb graphene surface. The orientation of the LC on the graphene domains determines which rotation angle will show bright and dark states under XPLM.

The alignment of the LC on the graphene film was studied by reflected Cross Polarized Light Microscopy (XPLM) and the results are presented in FIG. 2. In XPLM, a sample is placed between two crossed polarizers and rotated to observe areas of highest intensity (a bright state) and the lowest intensity (a dark state).

In LC, a dark state is observed when the nematic director ñ is parallel to the polarizer (or to the crossed analyzer). The bright state appears when ñ is at 45° with respect to the polarizer (or crossed analyzer). It is worth mentioning that the bare monolayer graphene film on copper foil appears completely dark.

After coating a thin LC layer on the graphene film, different crystallographic graphene domains with grain boundaries are clearly visible in the XPLM images shown in FIG. 2. Three domains: 1, 2 and 3 are labelled in FIG. 2 and their intensities were tracked as the sample was rotated under reflected XPLM. FIG. 2 shows that after rotating 45°, domain 1 becomes bright, domain 2 becomes dark and domain 3 becomes bright. FIG. 2 shows that after rotating 45° more (i.e. a total of 90° from the initial state), domain 1 becomes dark, domain 2 becomes bright and domain 3 becomes dark. FIG. 2 shows the normalized domain intensity of domains 1 and 2 as a function of the relative angle of rotation.

The $\pi$-$\pi$ stacking interaction is schematically illustrated in FIG. 2 by matching the LC's benzene rings on the graphene-honeycomb structure. Two possible LC domains on graphene are schematically presented in FIG. 2, and their respective dark or bright states are demonstrated by showing the director (ñ) orientation with respect to the polarizer and analyzer.

These results suggest that the LC on graphene can achieve a uniform planar aligned state, which can transit from dark to bright when rotated 45°.

This uniform planar aligned state is induced by the strong $\pi$-$\pi$ electron stacking.

Example 2

Smectic Alignment on Graphene

In a second prototype, ferroelectric LCs in the smectic-A* and smectic-C* were used as the liquid crystal. The monolayer graphene film was first grown by CVD processing onto a copper foil, then transferred onto glass. The glass substrate with graphene film was first placed on a hot plate at 110° C. A small droplet of ferroelectric liquid crystal (FLC) MX40636 (LC Vision, LLC, cooling phase sequence: Iso—97° C.-N*—82° C.-smectic-A*—76° C.-smectic-C*—−10° C. crystal) in the isotropic phase was placed on the graphene film. The LC droplet (in the isotropic phase) was then blown away gently by a dust blower, which left a thin LC layer in the isotropic phase at the graphene surface.

The LC-coated graphene on glass substrate was then slowly cooled down to the smectic-A* and then to the smectic-C* phase, respectively. The FLC MX40636-coated graphene film on glass substrate was then studied using XPLM.

Figure 3:
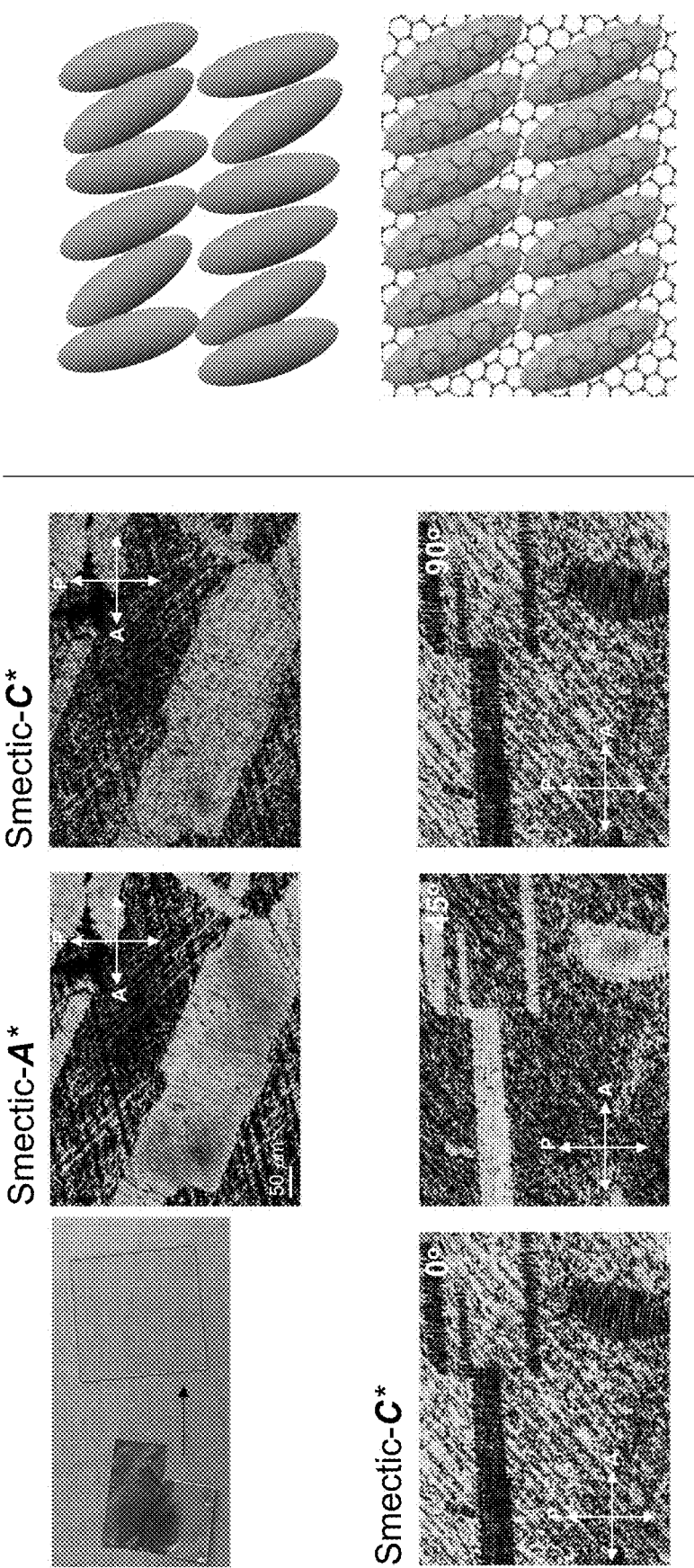
FIG. 3 illustrates several views. One view is a CVD-grown monolayer graphene film that has been transferred from the copper foil to the glass substrate. XPLM images of the smectic-A* phase on a monolayer graphene film on a glass substrate under a crossed polarised microscope. XPLM image of the smectic-C* phase on a monolayer graphene film on a glass substrate under a crossed polarised microscope. Microphotographs of the smectic-C* phase at three different relative angles, 0°, 45° and 90°, respectively, under a crossed polarised microscope. The domains' transition from dark to bright at every 45° rotation confirms aplanar alignment of the smectic-C* on graphene. Also illustrated is a Natural smecticC* phase. The final view illustrates Graphene stabilised smectic-C* phase schematic illustration of planar alignment.

FIG. 3 shows XPLM images of the smectic-A* and smectic-C* phases on graphene. Polycrystalline graphene grains are clearly visible from the dark and bright LC domains for both the phases.

FIG. 3 represents the smectic-C* phase on graphene at three relative angles: 0°, 45° and 90° to the crossed-polarizers. A domain's transition from dark to bright (or bright to dark) at every 45° rotation confirms that graphene imposes planar alignment on the smectic-C* phase due to the strong $\pi$-$\pi$ electron stacking. FIG. 3 schematically shows a natural smectic-C* phase. FIG. 3 schematically represents a graphene-stabilized smectic-C* order.

Example 3

LC-Graphene Electro-Optic Device

Figure 4:
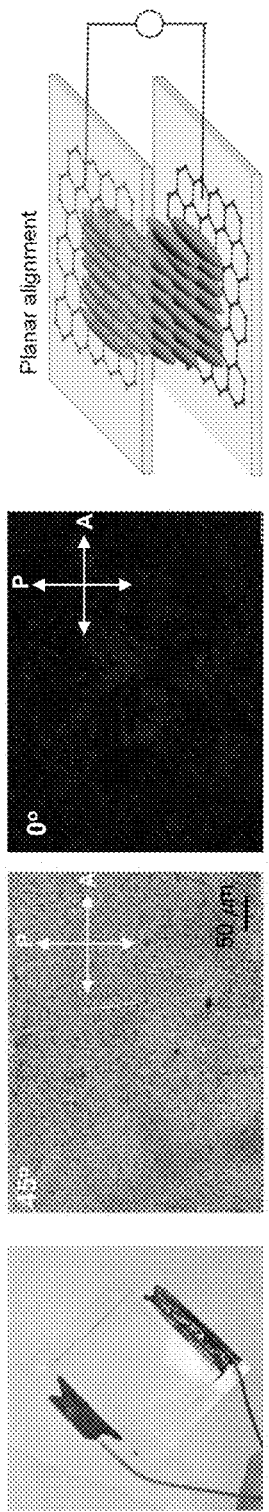
FIG. 4 illustrates several views. A LC device created using two graphene coated substrates, which are used as both the alignment layers and electrodes. XPLM image of the cell at 45° with respect to the polarizer and analyzer shows a bright state. XPLM image of the cell aligned along the polarizer axis shows a dark state. This indicates planar alignment of the LC is induced by the graphene surface. The final view is a Schematic drawing of the LC aligned in the device based on the XPLM images.

In another embodiment, shown in FIG. 4, an electro-optic LC device is comprised of a substrate with a graphene layer, a second substrate with a graphene layer, two Mylar spacers to hold the surfaces apart and a LC layer to fill in the cavity between graphene layers. This embodiment was tested in a prototype.

Two glass substrates with monolayer graphene film were used to prepare a cell (the monolayer graphene film was first grown by CVD processing onto a copper foil, then transferred onto glass). The glass substrates with graphene were placed together to make a cell with an average thickness of 12 μm. The graphene-based LC cell was then filled with the LC mixture E7.

The planar alignment of the LC in the cell was studied using XPLM (FIG. 4). Note that FIG. 4 shows a XPLM image of a bright region of the cell, which becomes dark when rotated by 45°. This confirms a planar alignment of the LC director in the cell. The cell was then rotated back to 0° relative position at its bright state and a voltage was applied across the cell using the graphene as electrodes.

Figure 5:
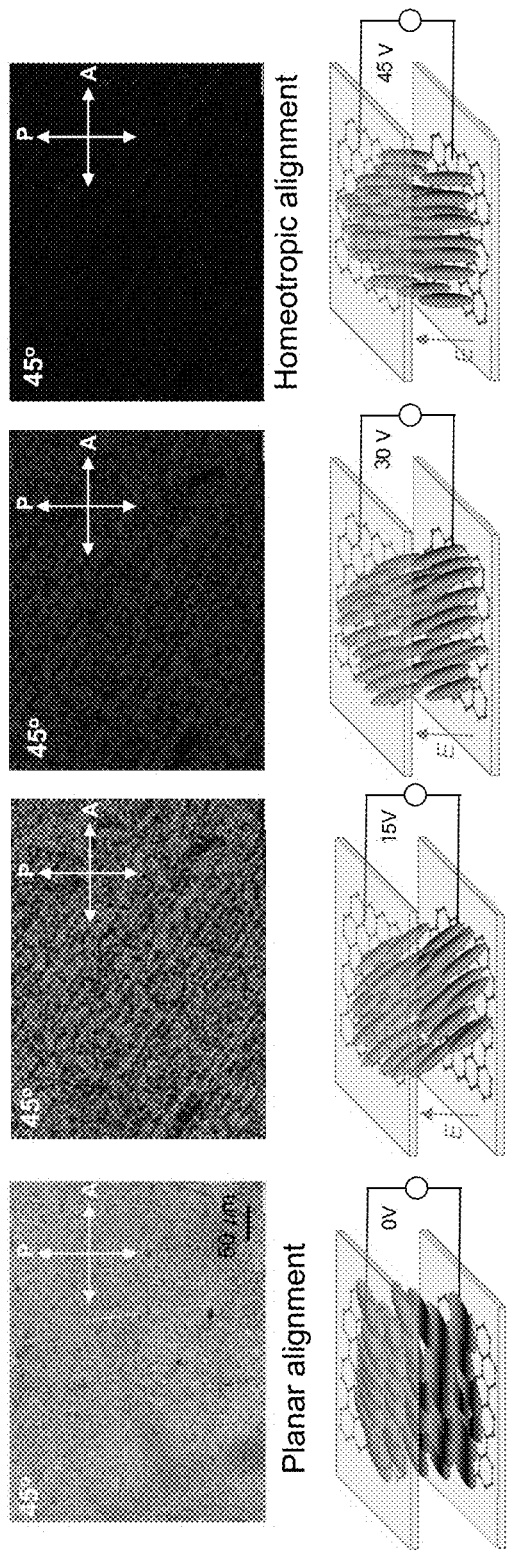
FIG. 5 illustrates several views. XPLM images of the LC in the graphene-based cell with no voltage, 15V, 30V and 45V. The corresponding schematics illustrate how the LC director starts to align with the electric field as the voltage increases, obtaining a homeotropic alignment at 45 V.

FIG. 5 shows the XPLM images of the cell at three different voltages: 15V, 30V and 45V, respectively. When the voltage increases across the cell, the LC director starts to reorient along the electric field, as schematically shown in FIG. 5. The cell shows a dark XPLM texture at 45V, indicating a homeotropic alignment of the LC director in the graphene-based LC cell. These results, thus, indicate that the graphene film can act both as the alignment layer and the electrodes in a graphene-based LC cell.

Example 4

LC-Graphene Cladded Waveguide

Figure 6:
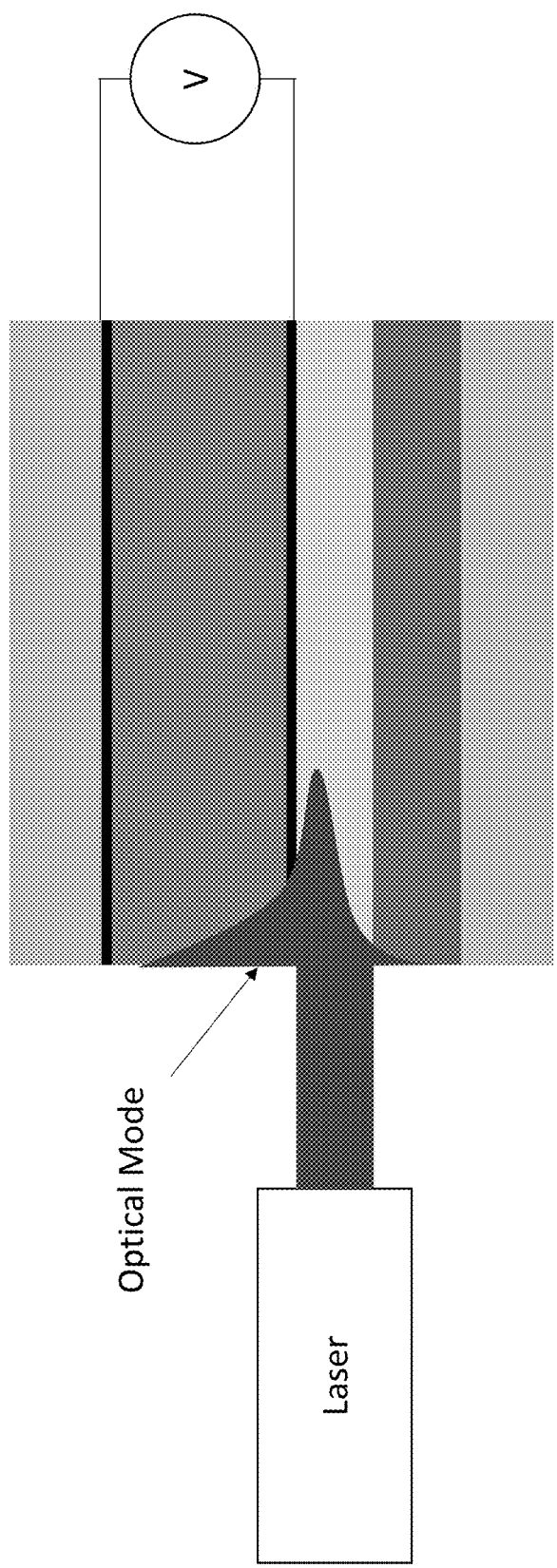
FIG. 6 illustrates a Schematic diagram of graphene electrodes being using in a LC cladded waveguide.

In another embodiment, shown in FIG. 6, graphene is used as an alignment layer and electrode for a LC cladded waveguide. In this architecture, the effective index of the propagation mode can be changed by applying a field across the graphene electrodes and inducing a reorientation of the LC.

This invention demonstrates the utility of graphene as a LC alignment layer.

The invention demonstrates that a monolayer of graphene can replace both the electrode and alignment layer in LC devices.

The invention enables a reduced path length through absorbing and scattering layers, extending the use of LC devices into spectral bands that were previously not feasible due to absorption and scattering of alignment layers and electrodes. These spectral bands may include, but are not limited to ultraviolet, visible, near-, short-wave, mid-wave and long-wave infrared.

This graphene alignment layer/electrode can be used for any LC-based electro-optic device including, but not limited to displays, polarization gratings, tunable filters, refractive optical waveguides.

The single conductive/alignment layer is not necessarily limited to graphene, but includes any other two-dimensional material with electrically conductive properties and a propensity to align LC materials and mixtures.

The single conductive/alignment layer, such as graphene, may be chemically modified directly to promote uniaxial LC alignment on the surface.

Uniaxial alignment of LC on graphene may be promoted by adding an additional photoalignment step, whereby polarized light is used to absorb or chemically bond LC-compatible molecules to the graphene surface.

Uniaxial alignment of LC on graphene may be promoted by non-surface means including, but not limited to flow alignment, photo-orientation and slow cooling from the isotropic phase.

Other embodiments include but at not limited to the LC layer comprised of a single molecular component or mixtures of components with a liquid crystal phase, including but not limited to nematic, cholesteric, smectic and discotic phases.

The LC may possess a positive or negative dielectric anisotropy and a permanent molecular dipole to facilitate molecular switching in response to an applied voltage Furthermore, the graphene can be multi-layered and the device substrate may be rigid or flexible.

With this invention, the graphene can be a liquid crystal alignment layer. The graphene can be an electrode for switching the orientation of a liquid crystal.

Taught herein is simultaneous demonstration of graphene as both an alignment layer and electrode. The embodiments taught herein reduce the gap between electrodes, and reduce voltage amplitudes.

A reduced path length (carbon atom-thick) allows for reduced absorption and scattering contributions over a wide spectral range. The examples taught herein are compatible with alignment of different LC phases (i.e. nematic, smetic).

These embodiments open the utility of LC-based electro-optic devices beyond limited spectral bandwidth of current alignment layers (i.e. polyimide) and electrodes (i.e. indium tin oxide, ITO).

Here, graphene provides a means to both align LC and apply a voltage in devices with a single carbon atom-thick layer.

The examples herein demonstrate the ability to minimize the number of layers in the device, simplify the fabrication process, have reduced optical path length and optimize the transmission.

Still furthermore, the examples demonstrate lower applied voltages and greater resistance to device degradation.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What we claim is:

1. A graphene and liquid crystal device wherein a layer of graphene is an alignment layer and an electrode for the liquid crystal device made from the steps of:
   providing a substrate;
   depositing a layer of graphene on the substrate;
   depositing a layer of liquid crystals on the layer of graphene;
   aligning the molecules of the layer of liquid crystal and the layer of graphene;
   creating π-π electron stacking;
   heating the graphene and liquid crystal device;
   cooling the graphene and liquid crystal device;

wherein the layer of liquid crystals comprised liquid crystals in the isotropic phase before the step of heating the graphene and liquid crystal device, and wherein the layer of liquid crystals comprised liquid crystals in the nematic phase after the step of cooling the graphene and liquid crystal device a uniform planar aligned state of the molecules of the layer of liquid crystal; wherein the affinity of phenyl rings with one another comprises π-π stacking and configured to drive alignment of the layer of liquid crystal molecules and the layer of graphene; and wherein the layer of graphene is an alignment layer and an electrode for a liquid crystal device.

2. A graphene and liquid crystal device wherein a layer of graphene is an alignment layer and an electrode for the liquid crystal device comprising:

a substrate;

a single layer of only graphene not including a composite on the substrate;

a single layer of liquid crystal on the single layer of graphene; and

π-π electron stacking;

wherein the molecules of the layer of liquid crystal and the layer of graphene are aligned;

further comprising a uniform planar aligned state of the molecules of the layer of liquid crystal;

wherein the affinity of phenyl rings with one another comprises π-π stacking and configured to drive alignment of the layer of liquid crystal molecules and the single layer of graphene excluding a composite; and wherein the layer of graphene is an alignment layer and an electrode for a liquid crystal device.

3. The graphene and liquid crystal device of claim 2 wherein the graphene and liquid crystal device is heated; wherein the graphene and liquid crystal device is cooled; wherein the layer of liquid crystals comprised liquid crystals in the isotropic phase before the step of heating the graphene and liquid crystal device, and wherein the layer of liquid crystals comprised liquid crystals in the nematic phase after the step of cooling the graphene and liquid crystal device.

4. The graphene and liquid crystal device of claim 2 further comprising a second single layer of graphene excluding a composite on the layer of liquid crystal.

5. The graphene and liquid crystal device of claim 4 wherein the layer of graphene is an electrode for switching the orientation of the layer of liquid crystal and wherein the liquid crystal comprises a ferroelectric.

6. The graphene and liquid crystal device of claim 5 wherein alignment of the liquid crystals is controlled by a voltage applied to the layer of graphene.

* * * * *